March 23, 1971 M. S. KRIESEL ET AL 3,572,250
CONE FOR AEROBALLISTICS MEMBER
Filed March 10, 1969

INVENTORS
JOHN D. AKERMAN
MARSHALL S. KRIESEL
BY
Dugger Peterson Johnson & Westman
ATTORNEYS

United States Patent Office 3,572,250
Patented Mar. 23, 1971

3,572,250
CONE FOR AEROBALLISTIC MEMBER
Marshall S. Kriesel, St. Paul, and John D. Akerman, Minneapolis, Minn., assignors to Aerospace Systems Company, Minneapolis, Minn.
Filed Mar. 10, 1969, Ser. No. 805,636
Int. Cl. F42b 15/00
U.S. Cl. 102—53                                       8 Claims

ABSTRACT OF THE DISCLOSURE

An aeroballistic missile having a cone or penetrating end member that is designed to provide for an effective multiple cone index to permit the aeroballistic member to penetrate soft and hard earth at substantially the same velocity and still to obtain substantially the same penetration.

In addition, the cone includes shock absorbing members which absorb impact loads when the cone strikes the earth to protect the pay load in the aeroballistic member.

SUMMARY OF THE INVENTION

A cone member for an aeroballistic missile or member which provides for substantially equally penetration in soft or hard earth by designing the cone to provide what is known as an effective multiple index. Cone index is a term used to establish the relative penetration values for missiles entering the earth at substantially the same velocity. A cone shaped leading end member is used that is provided with radially extended ribs proportioned so that on entering into hard earth, the ribs act much like a cone, and when the aeroballistic missile contacts softer earth, the recesses between the cone ribs are filled quickly with earth, and the base of the recesses act to present a substantially blunt end surface for the missile to prevent it from penetrating excessively far into the ground. The device also utilizes a shock absorbing means to protect the payload in the missile from damage upon impact with the earth.

DESCRIPTION OF THE PREFERRED EMBODIMENT

Figure 1:
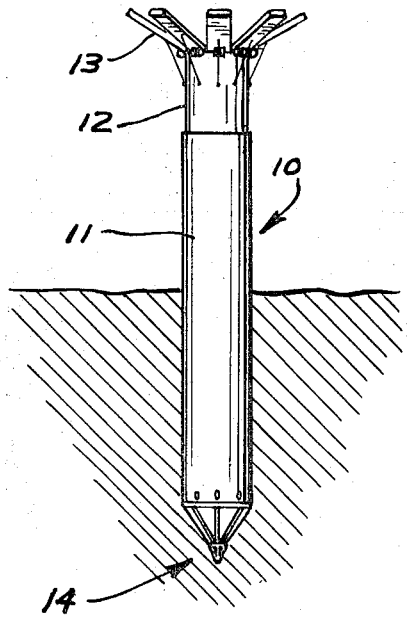
FIG. 1 is a side elevational view of an aeroballistic missile made according to the present invention shown embedded in the ground.

An aeroballistic missile illustrated generally at 10 is of the type which carries a payload, specifically a seismic detector, and which is dropped from an aircraft to permit the installation of a surveillance system by dropping a series of such missiles into the ground so that foot steps or the like occurring near the missile will transmit a seismic vibration to a receiver and in this way will function as a detector for troop movements and the like.

The aeroballistic missile 10 is made so that it has a cylindrical payload carrying body or tube 11, a tail assembly 12 which is used with fins 13 for controlling the rate of descent of the aeroballistic missile 10 as it comes from the aircraft. A nose cone section 14 is positioned to engage the ground and the missile thus embeds into the ground.

In aeroballistic missiles, it is well known that the penetration of the missile into the earth or other mass that it is to penetrate depends upon what is called a cone index. The cone index is the relationship of the base diameter of the nose cone to the length of the cone, and for different types of earth (different densities and the like) penetration will be different at the same missile velocity. Therefore, if the type of earth is known, the nose cone can be selected to give the proper penetration to make such that the aeroballistic missile will stand upright and will not penetrate so far into the ground as to be inoperative.

The real difficulty, of course, comes about because the earth profile changes greatly in very short distances or is unknown when the missile is dropped.

Figure 2:
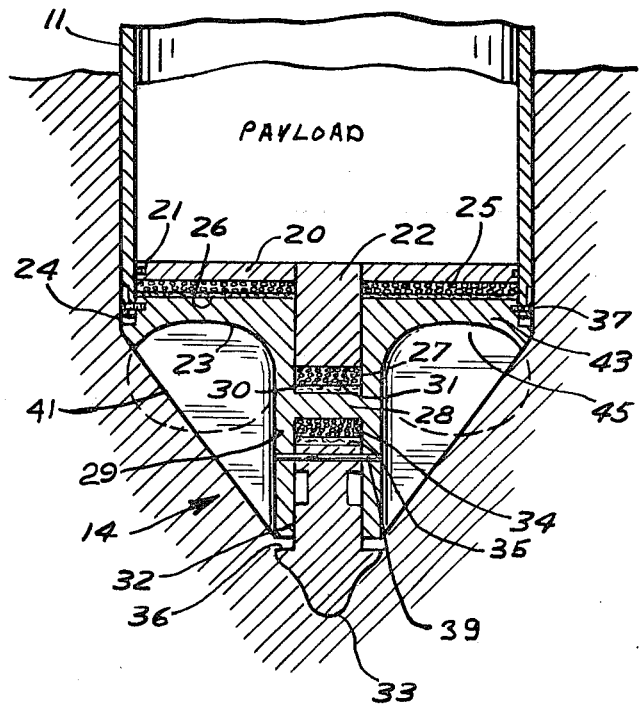
FIG. 2 is a fragmentary enlarged vertical sectional view of the nose cone section of the aeroballistic missile of FIG. 1.
Figure 3:
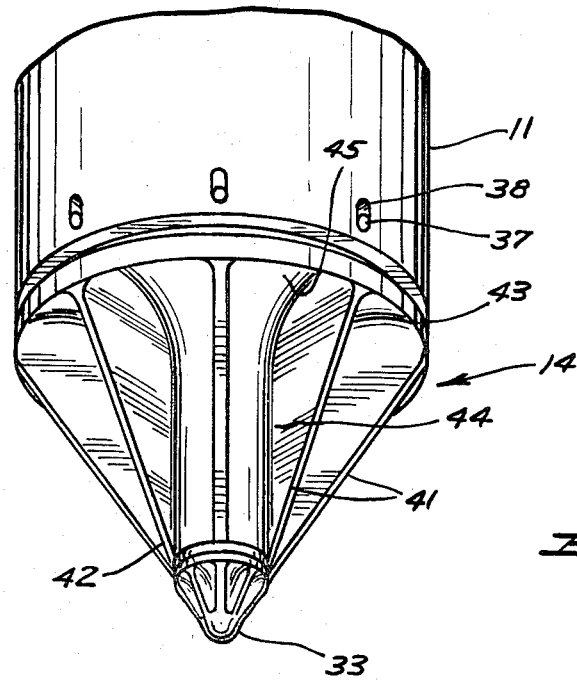
FIG. 3 is a fragmentary perspective view of the nose cone section of the aeroballistic missile of FIG. 1.

In order to help obviate some of the problems associated with differing conditions of earth, a unique nose cone assembly has been advanced. This nose cone assembly 14 is shown in detail in FIGS. 2 and 3. The nose cone assembly includes a mounting plate 20 which fits inside the tube or body 11 and actually provides the payload support. The plate 20 is sealed with respect to the interior of the body with an O-ring 21. A payload supporting rod extension 22 is attached to the plate 20 and extends axially outwardly from the tube or body 11. A nose cone body 23 has a center column member 29 which has a receptacle 27 that slides over the rod 22 and fits inside the tube. The nose cone body 23 has a base member 43 provided with a shoulder surface 24 which will align with and abut the outer end edge of the tube 11. A space between the plate and the base of the nose cone body 23 is filled with a crushable lead washer 25 which gives high resistance to crushing. The washer comprises a plurality of individual strands or wires of lead which are wound into place and which will compress a certain percentage under high impact loads, but will normally support the loads. In addition, a thin fiber or other softer washer 26 can be used between the plate 20 and the body 23. A bridge member 28 blocks off the receptacle 27 and defines the inner end surface of the receptacle. The space between the end of the rod 22 and the bridge member 28 is filled with a crushable washer 31 and a fiber washer 30.

A receptacle 32 is defined in the center member 29 of the nose cone body on the opposite side of the bridge 28, and a penetrating pin 33 is mounted in this receptacle 32. A lead washer 34 is positioned between the outer end of the bridge 28 and the inner end of the rod for the pin 33. A fiber washer 35 is also used in this receptacle. The pin 33 has a shoulder 36 which is spaced away from the outer end surface of the center member 29 of the nose cone body also. The nose cone body 23 is held inside the tube or body 11 of the aeroballistics missile with pins or screws 37 passing through provided slots 38 in the wall of the tube 11. When assembled, the nose cone body is spaced so that the pins 37 are at the lower ends of the slots 38 and the shoulder 24 is spaced from the end of the tube 11. The cone body can then slide a limited amount toward the payload in the tube 11. A shear pin 39 is also provided between the shank of pin or tip member 33 and member 29.

The cone body member 23 as shown provides a center core member 29 surrounding the recptacles 32 and 27. A plurality of ribs 41 extend from an outer end portion 42 of the center core member to the plate like base member 43. The ribs have sharp edges, and taper outwardly from the tip to the periphery of the base member so that they present a cone shaped exterior form. The ribs then define cavities 44 therebetween, and at the base member 43 these cavities have a curved concave inner surface 45 which when viewed in cross section tapers outwardly in direction away from the cone point adjacent the center member and then tapers back outwardly and in direction toward the cone point adjacent the periphery of the base to form scoop like surfaces at the base 43.

Thus the structure can be viewed in two ways. It can be viewed as a central column member having a base and ribs extending outwardly from the central member joining the base and tapering toward a point opposite from the base. In this case, the base would have relieved surfaces on the side thereof toward the ribs. Another way of looking at it is that if it is a solid conical member to start with, the cavities 44 are formed to make ribs in the cone extending from the point toward the base, and the surface of the base toward the ribs is concave, that is, scooped away to provide for a tapering surface on the outer edges of the base which curves in direction back toward the point of the cone.

The advantage of this type of cone structure is that in hard ground, the ribs provide a conical surface for easy penetration of the earth to insure that the aeroballistic missile will penetrate a sufficient depth so that it will stand erect during use. The end acts much like a solid cone at that time. However, in softer ground, the concave surfaces 45 act like a slide for the ground entering the cavities 44, and the surfaces tend to cause the ground to scoop up into a ball much like an ice cream scoop, and at that time the soil packs tightly back against the concave surfaces to form almost a blunt end to the aeroballistic missile as shown by the dotted lines in FIG. 2. This blunt end then slows down the penetration of the missile much greater than it does in hard ground and insures that the missile will not penetrate excessively but will stop before this happens.

In effect, then, the cone shown having the radially extending ribs or flutes with a concave surface on the base member between the ribs actually has a multiple cone index depending on the surface conditions of the ground it penetrates and this multitple cone index is automatic. The softer the ground the more tendency there is for the ground to travel around the concave surface 45 and form the ball like lumps which form an effective blunt end to the missile. Harder ground merely fills in and does not scoop around the concave surface. The end of the missile presents in effect a cone shaped surface generally corresponding to the taper of the ribs 41. The ribs 41 do have sharpened leading edges to increase the penetration thereof.

The ribs 41 also will crack a harder surface and cause it to break up into smaller pieces. The ribs also displace the earth fragments for making cone entrance easier.

The nose cone also protects the payload with two separate shock absorbing capabilities. These shock absorbing devices act sequentially. First, the shock of impact is transferred by the nose of the penetrating pin 33 to the shear pin 39, which shears and absorbs some load and then the washers 34 and 35 are crushed, and shoulder 36 seals upon the end of cone body 23. The impact peak loads are absorbed. Then the second impact load from decelarating the payload is absorbed by compressing washers 25, 26, 30 and 31. The shoulder 24 will seat against the end of tube 12 when these washers crush. The sharp peak impact loads are absorbed by the first sequence of shearing the pin 39 and compressing washers 34 and 35 and the decelaration forces are absorbed by washers 25, 26, 30 and 31 against the base member 43.

The shock absorbing action minimizes the chances of damaging the payload.

What is claimed is:

1. A nose cone for an aeroballistic missile comprising a base member, a central column of substantially smaller diameter than the base member integral with said base member and extending outwardly therefrom, and a plurality of narrow ribs spaced around the center column and having edge surfaces each tapering from the outer end of said center column to adjacent the outer peripheral edge of said base member, said ribs being spaced apart to form cavities therebetween, the surface of said base member between said ribs being concave.

2. The nose cone of claim 1 further characterized in that the concave surfaces between the ribs have first sections tapering from the center column in direction away from the outer end of the column and second sections adjacent the periphery of the base member tapering outwardly and in direction toward the outer end of said column.

3. The nose cone of claim 1 and means to attach said cone to an aeroballistic missile, said missile comprising a tubular member, a payload in said tubular member, and means to support the payload including a plate inside the tubular member, said base member having a portion extending into the tubular member and a crushable member between said plate and said base member, said means to attach said cone to said missile including slot means permitting limited movement of the nose cone relative to the tubular member.

4. The nose cone of claim 1 characterized in that the outer end of said center column is tubular to form an opening, a tip member, said tip member having a shank portion slidably fitted in the opening of the center column, said opening being partially defined by an interior end wall, and a crushable means between the shank and the end wall, said tip member being mounted to enable movement thereof toward the end wall of the opening to crush said crushable means upon a sufficiently high input load on the tip member.

5. The device of claim 4 and shear pin means between the tip member and the center column to prevent slidable movement of said tip member until a predetermined minimum load on the tip member is reached.

6. An aeroballistic missile comprising an outer housing, a nose member at one end of the outer housing, means to mount said nose member to the housing, a payload support inside the housing and movable with respect thereto, and a crushable means between the payload support and the nose member, said crushable means normally supporting the weight of the payload.

7. The missile of claim 6 wherein said nose member has a tubular opening defined in an outer end portion thereof, a tip member, said tip member having a shank portion slidably fitted in the opening of the nose member, said opening being partially defined by an interior end wall, and a crushable means between the shank and the end wall, said tip member being mounted to enable movement toward the end wall of the opening to crush said crushable means upon a sufficiently high impact load on the tip.

8. The missile of claim 6 further characterized in that the nose member is comprised of a plurality of planar ribs, said ribs being spaced apart and extending generally radially outwardly from a central axis of said missile, said ribs tapering from a narrow outer end to a wide portion adjacent the missile housing.

References Cited
UNITED STATES PATENTS

| | | | |
|---|---|---|---|
| 1,178,516 | 4/1916 | Hardcastle | 102—92.1 |
| 3,002,453 | 10/1961 | Fedor et al. | 102—53X |
| 3,045,753 | 7/1962 | Goodwin | 102—52X |
| 3,048,110 | 8/1962 | West | 102—53 |

ROBERT F. STAHL, Primary Examiner

U.S. Cl. X.R.
102—10, 62, 92.4